United States Patent
Hoder

(10) Patent No.: US 9,986,280 B2
(45) Date of Patent: May 29, 2018

(54) IDENTIFYING REFERENCE CONTENT THAT INCLUDES THIRD PARTY CONTENT

(71) Applicant: Google LLC, Mountain View, CA (US)

(72) Inventor: Krystof Hoder, Zurich (CH)

(73) Assignee: Google LLC, Mountain View, CA (US)

( * ) Notice: Subject to any disclaimer, the term of this patent is extended or adjusted under 35 U.S.C. 154(b) by 0 days. days.

(21) Appl. No.: 14/684,364

(22) Filed: Apr. 11, 2015

(65) Prior Publication Data

US 2016/0301966 A1 Oct. 13, 2016

(51) Int. Cl.
| | | |
|---|---|---|
| H04N 7/16 | (2011.01) | |
| H04N 21/2743 | (2011.01) | |
| H04N 21/234 | (2011.01) | |
| H04N 21/254 | (2011.01) | |
| G06F 21/10 | (2013.01) | |
| H04L 29/06 | (2006.01) | |

(52) U.S. Cl.
CPC ......... *H04N 21/2743* (2013.01); *G06F 21/10* (2013.01); *H04L 63/30* (2013.01); *H04N 21/23418* (2013.01); *H04N 21/2541* (2013.01)

(58) Field of Classification Search
CPC ......... H04N 21/2743; H04N 21/23418; H04N 21/2541; H04L 63/30; G06F 21/10
See application file for complete search history.

(56) References Cited

U.S. PATENT DOCUMENTS

| | | | | |
|---|---|---|---|---|
| 8,453,248 | B2 * | 5/2013 | Morvan | G06K 9/00711 713/176 |
| 8,655,826 | B1 * | 2/2014 | Drewry | G06F 21/10 706/48 |
| 8,706,675 | B1 | 4/2014 | Samaniego et al. | |
| 9,693,117 | B2 * | 6/2017 | McMillan | H04N 21/8352 |
| 2008/0040807 | A1 * | 2/2008 | Lu | H04N 21/2541 726/26 |
| 2008/0059536 | A1 * | 3/2008 | Brock | G06F 21/10 |
| 2010/0262488 | A1 * | 10/2010 | Harrison | G06Q 30/02 705/14.46 |
| 2010/0263020 | A1 | 10/2010 | Harrison et al. | |
| 2010/0287201 | A1 * | 11/2010 | Damstra | G06F 17/30781 707/780 |
| 2012/0124638 | A1 * | 5/2012 | King | G06Q 10/101 726/1 |

(Continued)

OTHER PUBLICATIONS

PCT International Search Report and Written Opinion for PCT/IB2016/051699, dated Aug. 18, 2016, 9 Pages.

*Primary Examiner* — Nasser M Goodarzi
*Assistant Examiner* — Patrick A Ryan
(74) *Attorney, Agent, or Firm* — Byrne Poh LLP

(57) ABSTRACT

A reference verification module identifies content items stored in a content repository that include at least a portion of the content included in a reference content item provided by an entity. The reference verification module classifies the reference content item based on the uneven distribution of the percentages of the identified content items that include each of the claimed portions. Specifically, if the average difference between the percentage of content items that include a given portion and the percentages of the remaining content items is above a threshold, then the reference verification module classifies the reference content item as having a higher than threshold likelihood of including third party content.

21 Claims, 5 Drawing Sheets

(56) References Cited

U.S. PATENT DOCUMENTS

| | | |
|---|---|---|
| 2013/0014209 A1 | 1/2013 | Chastagnol et al. |
| 2013/0326025 A1* | 12/2013 | Clark ..................... H04L 67/02 709/219 |
| 2014/0156691 A1 | 6/2014 | Conwell |
| 2015/0012616 A1 | 1/2015 | Pearl et al. |

* cited by examiner

IDENTIFYING REFERENCE CONTENT THAT INCLUDES THIRD PARTY CONTENT

BACKGROUND

Field

Disclosed embodiments generally relate to the field of managing user generated digital content, such as video and audio content, and, in particular, to identifying reference content items that include third party content.

Description of the Related Art

Content hosting services host and deliver digital content items, such as videos, to users. Users provide content to the hosting service, and that content may include portions that are user generated as well as portions that are not generated by the user. In the latter case, a content owner other than the user may have rights in the content, thus making it desirable to detect the presence of that content in user-uploaded videos. To help detect such content items, rights holders often provide reference content to the content hosting service. The content hosting service then attempts to match content received from users with reference content, and when a match occurs, the content hosting site can take an appropriate action. In some cases, such reference content items themselves may inadvertently include third party content to which the entity that provided the reference content item does not have rights, thus leading to incorrect matching and flagging of the user generated content.

SUMMARY

A content hosting service identifies reference content items that include third party content to which the entities providing the reference content items do not have rights. To identify such a reference content item, a reference verification module of the content hosting service identifies content items uploaded by users that include at least one portion of the reference content item. A portion of the reference content item matching the user-uploaded content item is a "claimed portion," and the user-uploaded content including the claimed portion is a "claimed content item." For a particular claimed portion of a reference content item, a high incidence of inclusion of that claimed portion in uploaded content compared to other claimed portions of the same reference content item is indicative of the presence of third-party content.

If, therefore, any claimed portion of the reference content is included in claimed content items with greater frequency than other portions of the reference content, then the reference verification module classifies the reference content item as having a high likelihood of including third party content. Conversely, if claimed portions of the claimed content items are representative of the reference content as a whole, reference verification module classifies the reference content item as having a lower likelihood of including third party content. The basis of such a classification model is founded on the general observation that a significantly large number of content items including a small portion of the reference content item is an indicator of the small portion in fact being third party content.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein identifies reference content items that include third party content. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
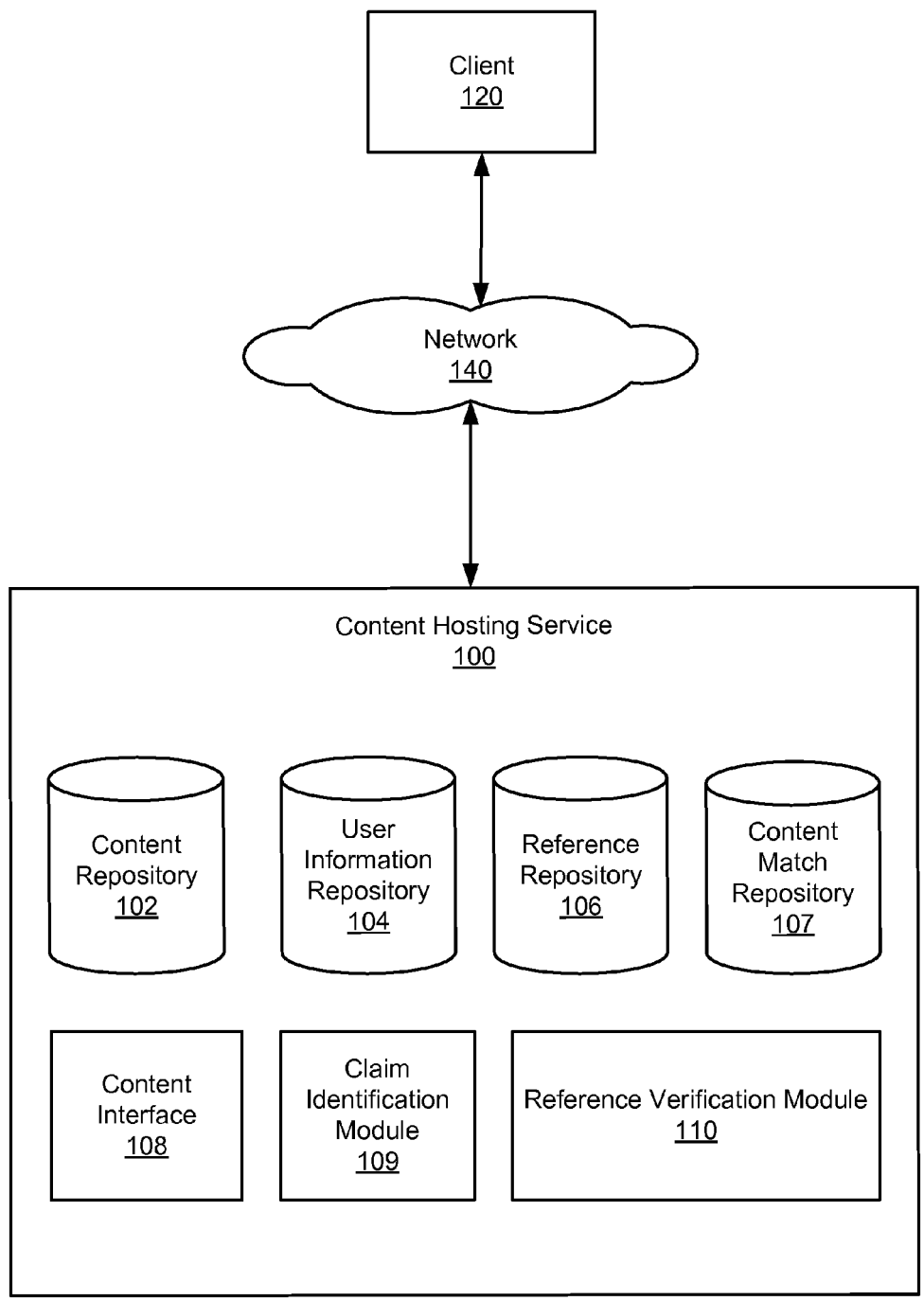
FIG. 1 illustrates a system for identifying reference content items that include protected content according to one embodiment.

FIG. 1 illustrates a system for identifying reference content items that include protected content according to one embodiment. As shown, the system includes a content hosting service 100 and a client 120 coupled to each other via a network 140.

The client 120 accesses digital content through the network 140 and presents digital content to a user. Presenting digital content includes playing a video or audio file as well as displaying an image or animation. In one embodiment, the client 120 is a computer, which is described further below with respect to FIG. 5. An example client 120 includes a desktop, a laptop, a tablet, a mobile device, smartphone, a smart television, and a wearable device. Using the client 120, a user may upload and manage digital content on the content server 120, which includes creating and modifying playlists of digital content. The client 120 may include software, such as a web browser or other application for viewing digital content. The client 120 may also include software such a video player, an audio player, or an animation player to support presentation of embedded digital content. The client 120 may view content on the content hosting service 100 regardless of what user or device provided the content to the hosting service 100, subject to any content-related or user-related permissions settings implemented by content hosting service 100 or content providers.

The network 140 enables communications among the entities connected to them through one or more local-area networks and/or wide-area networks. In one embodiment, the network 140 is the Internet and uses standard wired and/or wireless communications technologies and/or protocols. The network 140 can include links using technologies such as Ethernet, 802.11, worldwide interoperability for microwave access (WiMAX), long term evolution (LTE), 3G, 4G, digital subscriber line (DSL), asynchronous transfer mode (ATM), InfiniBand, and/or PCI Express Advanced Switching. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and/or file transfer protocol (FTP).

The data exchanged over the network 140 can be represented using technologies and/or formats including hypertext markup language (HTML), extensible markup language (XML), and/or JavaScript Object Notation (JSON). In addition, all or some of the transmitted data can be encrypted using conventional encryption technologies such as the secure sockets layer (SSL), transport layer security (TLS), virtual private networks (VPNs), and/or Internet Protocol security (IPsec). In another embodiment, the entities use custom and/or dedicated data communications technologies instead of, or in addition to, the ones described above.

The content hosting service 100 stores digital content items and serves these content items to viewing users of client devices 120. In the illustrated embodiment, the content hosting service 100 includes a content repository 102, a user information repository 104, a reference repository 106, a content interface 108, a claim identification module 109, and a reference verification module 110.

Many conventional features, such as firewalls, load balancers, application servers, failover servers, network management tools and so forth are not shown so as not to obscure the features of the system. A suitable service for implementation of the content hosting service 100 is the YOUTUBE™ service, found at www.youtube.com; other content hosting services are known as well, and can be adapted to operate according to the teaching disclosed here. The term "service" in the context of the content hosting service 100 represents any computer system adapted to serve content using any internetworking protocols, and is not intended to be limited to content uploaded or downloaded via the Internet or the HTTP protocol. The term "module" refers to computer program logic for providing a specified functionality. A module can be implemented in hardware, firmware, and/or software. A module is typically stored on a computer-readable storage medium such as storage device, loaded into a memory, and executed by a processor. In general, functions described in one embodiment as being performed on the server side can also be performed on the client side in other embodiments if appropriate. In addition, the functionality attributed to a particular component can be performed by different or multiple components operating together.

The content items served by the content hosting service 100 may include video, audio, or a combination of video and audio. Alternatively, a content item may be a still image, such as a JPEG or GIF file or a text file. A content item may be uploaded to the content hosting service 100 by the users of the client devices 120 or may be acquired from professional content creators, such as production companies, record labels, and publishers. Client devices 120 may access the content items directly on the content hosting service 100. Alternatively, client devices 120 may access the content items via third-party services that embed links to the content items on their platforms. When a client 120 accesses an embedded link on a third-party service, the content hosting service 100 serves the content item to the client device 120. In one embodiment, the third-party service may be a website. In an alternate embodiment, the third-party service may be a native desktop or mobile application.

In some embodiments, the content hosting service 100 includes a user information repository 104, which stores a user profile associated with each user who uploads videos to and/or accesses videos served by the content hosting service 100 via a client device 120. A user profile includes identification information associated with the user as well as access data related to the user's activities on the content hosting service 100. In particular, the access data indicates whether a user watched a video, skipped a video, scrolled up or down through a web page including a video, shared a video with other users, added a video to a playlist, flagged a video, blocked a video from a playlist or a collection of videos, favorited a video, gave a video a favorable rating (e.g. liked a video using a FACEBOOK™ account or +1'd a video using a GOOGLE+™ account), or gave a video an unfavorable rating (e.g. "thumbs down"). In one embodiment, the content hosting service 100 provides the users with the opportunity to opt-out of having the users' access data collected and/or shared with other modules in the content hosting service 100 or other services.

The content hosting service 100 also includes a content repository 102 that stores the content items hosted and served by the content hosting service 100. For each content item, the content repository 102 stores both the content item and metadata associated with the content item. The metadata includes a unique identifier associated with the content item, the content item's source (e.g., an uploader name and an uploader user identifier), and attributes of the content item (e.g., a title, a description, a file size, a file type, a frame rate, a resolution, an upload date).

Content items in the content repository 102 are accessible via the content interface 108 included in the content hosting service 100. In operation, to access a given content item, the client 120 accesses the URI corresponding to the content item. The URI corresponding to the content item may be a URL, a URN, or some other form of pointer or address. In one embodiment, the URI includes a domain associated with the content hosting service 100 and the content identifier associated with the content item. Based on the content identifier, the content interface 108 retrieves the content stored in the content repository 102 that is associated with the identifier and presents the content. The content interface 108 may include a video or audio player or an image slideshow viewer, for example. In some embodiments, advertisements are also provided to the client device 120 before, during or after the requested content.

The content interface 108 may additionally retrieve metadata associated with the content item from the content repository 102 and present the metadata along with the content item. The presented metadata includes the title of the content item, the upload date of the content item, and an identification of a user who uploaded the content item. The content interface 108 may also present additional content items for selection and subsequent viewing. The presentation of the additional content item may include a title of the content item and a preview thumbnail retrieved from the content repository 102. The additional content items may be related to the content item currently being presented. For example, the additional content items may have content similar to the content of the content item currently being played or may be uploaded by the same user.

Each content item in the content repository 102 may be associated with one or more channels—each channel being a collection of curated content items. A channel may include content items available from a common source or content items having a common topic or theme. In various embodiments, the content items included in a channel can be content items chosen by a user of the content hosting service 100, such as the channel owner, content items made available by a user of the content hosting service 100, content items uploaded by a user of the content hosting service 100, content items chosen by a content provider, content items chosen by a broadcaster, content items chosen by an advertiser, etc.

The content hosting service 100 includes a reference repository 106 that stores reference content to be matched against uploaded content. The reference content may, for example, be provided by content owners. A content owner is an entity that owns or controls at least some of the rights to a particular work. Examples of such entities include an individual, a group of individuals, a music or video production company or studio, an artists' group, and a royalty collection agency. Reference content may include audio, video, a combination of audio and video, or still images.

Along with the reference content, the reference repository 106 may store metadata associated with each reference content item: the title of the reference content item, the international standard recording code (ISRC), the artist/director of the reference content item, the recording label of the reference content item, an episode title/number of the reference content item, the season of the reference content item, and actors in the reference content. In some embodiments, the reference content itself is stored by content hosting service 100. In other embodiments, indicia of the content, for example fingerprints associated with the content, are stored instead, as is understood by those of skill in the art.

The claim identification module 109 identifies uploaded content items that match reference content identified in the reference repository 106. Content items that are matched against reference content by the claim identification module 109 are referred to herein as claimed content items. In one embodiment, to identify claimed content items, the claim identification module 109 generates digital fingerprints for each content item stored in the content repository 102 and each reference content item stored in the reference repository 106. The claim identification module 109 then compares the digital fingerprint of a reference content item with each of the content items to identify content items that include content matching at least a portion of the reference content item. The claim identification module 109 may be configured with other well-known mechanisms for comparing digital content.

If a match is found between reference content and uploaded content, claim identification module 109 stores indicia of the claimed content item in the content match repository 107. In various embodiments, the indicia of the claimed content item identify what portion of the reference content matched the claimed content.

Responsive to the match being made, the content hosting service 100 takes an action with respect to the user generated content. The particular action taken in various embodiments is a function of a policy set by content hosting service 100, the reference content owner, or a combination of both, and may include, for example, allowing the content to be hosted and served, blocking the content, or allowing the content to remain but to generate revenue for the site and content owner by serving advertising along with the content.

In some cases, reference content may itself include third-party content—that is, content to which the provider of the reference content does not have rights. As a consequence, the claim identification module 109 may identify a match between reference content from the reference repository 106 and content in the content repository 102, but the match is a result of the presence of the third-party content in both the reference and the user-generated content, rather than the presence of content to which the content owner actually has rights. In turn, this can result in a policy being misapplied to the user-generated content. For example, if the user-generated content includes a segment that is in the public domain, and that public domain segment is also in the reference content, a match could be found by the claim identification module 109. If the owner of the reference content has indicated that claimed content should be blocked, then the user-generated content might be blocked even though it does not truly include any content to which the rights owner actually has rights.

To identify reference content that may include third-party content, the reference verification module 110 proceeds as follows. The reference verification module 110 determines, for each match made by the claim identification module 109 against the reference content item, which portion(s) of the reference content were responsible for the match. We refer to a portion of the reference content that is included in at least one user-generated content item as a claimed portion. The reference verification module 110 then classifies the reference content item based on the number of claimed content items that include each of the claimed portions. If a subset of the claimed portions are included in greater than a threshold percentage of the claimed content items, then the reference verification module 110 classifies the reference content item as having a high likelihood of including third party content. The threshold percentage is determined based on a multiple of the average number of claimed content items that include each of the claimed portions. Conversely, if claimed portions of the claimed content items are representative of the reference content as a whole, then the reference verification module 110 classifies the reference content item as having a lower likelihood of including third party content.

The reference verification module 110 thus draws on a correlation between the likelihood of the reference content item including third party content and the differences between the numbers of claimed content items that include each of the claimed portions. The correlation is based on the observation that, for the typical case, a significant inclusion of only a few portions of the reference content in a large number of content items is an indicator of that small portion being third-party content. This general observation may not hold true in specific cases, such as for videos of sporting events where only the video of a particular play may be illegitimately included in a significant number of the identified content items. The reference verification module 110 in one embodiment accounts for these outlier scenarios in its classification of reference content items. Alternatively, human oversight may identify such specific cases and rectify incorrect classifications by the reference verification module 110 of reference content items that fall within such cases.

Figure 2:
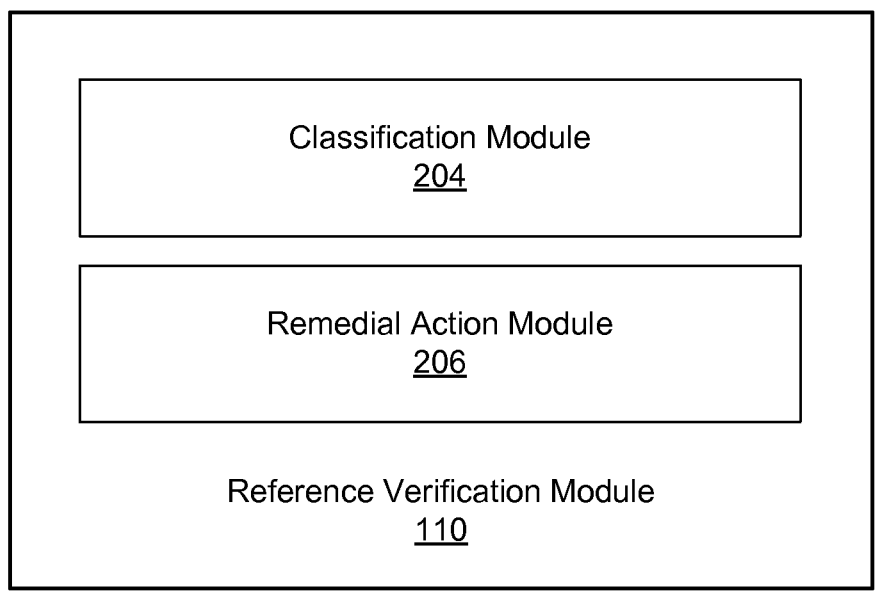
FIG. 2 is a detailed illustration of the reference verification module according to one embodiment.

FIG. 2 illustrates the reference verification module 110 according to one embodiment. As shown, the reference verification module 110 includes a classification module 204 and a corrective action module 206. For ease of discussion, the following discussion provides operational details for each of these modules with respect to a single reference content item.

The classification module 204 classifies the reference content item according to whether the reference content is determined to include third party content. In operation, the classification module 204 segments the reference content into different portions. In the case of audio or video content, the segmentation may be based on units of time such that each portion corresponds to a unit of playback time of the content. In other embodiments, the segmentation may be based on the content, e.g., specific points in the video content, or on the distribution of claimed portions, e.g., where claimed portions begin and end. For each portion of the reference content, the classification module 204 determines how often that portion is part of a match between the reference content item as a whole and uploaded content items (referred to herein as the "portion match frequency").

To determine the portion match frequency for a given portion, the classification module 204 first determines the total number of claimed content items that include at least one claimed portion. The classification module 204 then determines the portion match frequency for the given portion as the percentage of the total number of claimed content items that include the portion of the reference content. As an example, Table 1 illustrates the portion match frequencies for portions of reference content item A with respect to one hundred uploaded content items C1-C100. Each of the content items C1-C100 is identified by the claim identification module 109 as including at least one portion, but not necessarily the same portion, of the reference content included in reference content item A.

TABLE 1

| Reference Item A | Content Items Including Portion | Portion Match Frequency |
| --- | --- | --- |
| Portion 1 | C1-C95, C99 | 96% |
| Portion 2 | C96 | 1% |
| Portion 3 | C97 | 1% |
| Portion 4 | C98, C99 | 2% |
| Portion 5 | C100 | 1% |

According to the illustrated example, for each of the uploaded content items C1-C100 that match some part of reference content A, 96% of those items (C1-C95 and C99) match against Portion 1 of content item A. Only 1% of the items (C100) match against Portion 5, for example.

As another example, Table 2 illustrates the portion match frequencies for portions of the reference content item B with respect to one hundred content items C1-C100. Each of the content items C1-C100 are identified by the claim identification module 109 as including at least one portion, but not necessarily the same portion, of reference content item B.

TABLE 2

| Item B | Content Items Including Portion | Portion Match Frequency |
| --- | --- | --- |
| Portion 1 | C1-C54 | 42% |
| Portion 2 | C20-C65 | 41% |
| Portion 3 | C37-C68 | 32% |
| Portion 4 | C63-C85 | 23% |
| Portion 5 | C65-C100 | 36% |

The classification module 204 determines the likelihood of the reference content item including third party content based on the relative difference between the portion match frequencies computed for the portions of the reference content item. Specifically, the classification module 204 determines the average difference between each portion match frequency and the remaining portion match frequencies. If the average difference for at least one portion is above a threshold difference, e.g., 50%, then the classification module 204 classifies the reference content item as having a high likelihood of including third party content. Conversely, if the average differences for various portions of the reference content item are within a given range, then the classification module 204 classifies the reference content item as having a low likelihood of including third party content. The high and low likelihoods are static quantifiers—either a reference content item has a high likelihood or has a low likelihood of including third party content.

In the example illustrated in Table 1, the portion match frequency of portion 1 is significantly larger than the portion match frequencies of portions 2-5. Therefore, the reference content item is determined to have a high likelihood of including third party content. More specifically, portion 1 is determined to have a high likelihood of including third party content. Conversely, in the example illustrated in Table 2, none of the portion match frequencies is significantly larger than the remaining portion match frequencies. Therefore, the reference content item is determined to have a low likelihood of including third party content.

Figure 3A:
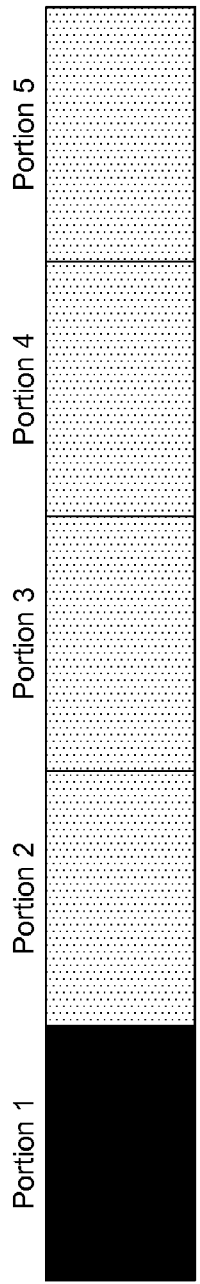
FIG. 3A is an illustration of the distribution of the number of identified content items that include claimed portions of reference content item A of Table 1 according to one embodiment.

FIG. 3A is an illustration of the distribution of the number of claimed content items that include claimed portions of reference content item A of Table 1 according to one embodiment. As shown, portion 1 has a portion match frequency above 90%. The remaining portions have portion match frequencies below 45%. Therefore, based on this significant difference between the portion match frequency of portion 1 and the remaining portions, the reference content item A is determined to have a high likelihood of including third party content.

On the other hand, in the example illustrated in Table 2, the portion match frequency of the portions 1-5 are within the same range, i.e., the portion match frequency of none of the portions is significantly larger than the remaining portions. Therefore, the reference content item is determined to have a low likelihood of including third party content.

Figure 3B:
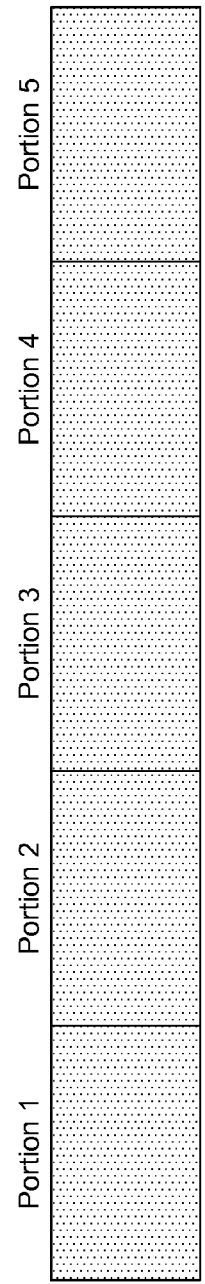
FIG. 3B is an illustration of the distribution of the number of identified content items that include claimed portions of reference content item B of Table 2 according to one embodiment.

FIG. 3B is an illustration of the distribution of the number of claimed content items that include claimed portions of reference content item B of Table 2 according to one embodiment. As shown, each of the portions has a portion match frequency below 45%, and the average difference for each portion match frequency relative to the remaining frequencies is below a below a threshold difference. Therefore, the reference content item is determined to have a low likelihood of including third party content.

Referring again to FIG. 2, in various embodiments, the classification module 204 classifies the reference content item based on the determined likelihood that the reference content item includes third party content and other factors associated with the reference content item and/or the identified content items. Specifically, the classification module 204 determines the category of the content included in the reference content item based on the metadata of the reference content item stored in the reference repository 106. If the category is a whitelisted category—one that tends to produce false high likelihoods (also referred to herein as "false positives for including third party content"), then the classification module 204 may adjust downward the determined likelihood using a weighting factor so that the reference content item is not classified as including third party content. Table 3 illustrates example category types for reference content items that may result in a false positive for the reference content item including third party content. The illustrated categories are exemplary, and may be selectively adopted and adjusted as seen fit by the implementer. For example, the classification module 204 uses a training model to determine which of the whitelisted categories should result in a downward adjustment of the determined likelihood of a reference content item including third party content.

TABLE 3

| Whitelisted Content Item Category | Reason for False Positive |
| --- | --- |
| Popular Sport | Many content items illegitimately include popular moment in a game. |
| Video Part Popular | Many content items illegitimately include a popular part of a longer video. |
| Music Part Popular | Many content items illegitimately include a popular part of a longer song. |
| Music Part Reused | Many content items illegitimately include a part of a viral content item that includes a part of a longer song. |
| Shared Introduction | Many content items illegitimately include an introductory portion of a television show that gets repeated in every episode. |
| Owned Viral | Many content items illegitimately include a portion of a viral video. |

In a specific example, for a reference content item that includes a sporting event, a significant number of uploaded content items may include only a single play of the sporting event, such as a game-winning goal in a hockey game. Such a scenario might result in a false positive for the reference content item including third party content, because that portion of the reference content item would be far more likely to be responsible than other portions for matches against uploaded content. Therefore, given the sports category of the reference content item, the classification module 204 may adjust downward the determined high likelihood of included third party content.

As another example, a reference content item may include an introduction to a television show that gets repeated in every episode and, therefore, any content item that includes an episode of the television show would include the introduction to the television show. Such a scenario would result in a false positive the reference content item including third party content. Therefore, given the television show category of the reference content item, the classification module 204 may adjust downward the determined high likelihood for including third party content if the claimed portion determined to have a high likelihood of third party content is the introduction to the television show.

In cases where the determined high likelihoods are not indicative of false positives, the classification module 204 classifies the reference content item as having a high likelihood of including third party content. In some embodiments, the classification module 204 also classifies the individual portion(s) of the reference content item that are determined to have high likelihoods of being third party content.

For reference content items that are classified as having a high likelihood of including third party content, the remedial action module 206 performs one or more remedial actions. Such remedial actions include blacklisting the reference content item temporarily until further verification and generating a request for further programmatic or manual verification. The claim identification module 109 does not take remedial action against claimed content items that include reference content included in the blacklisted reference content item until further verification. The remedial action module 206 may additionally notify the entity that provided the reference content item that the reference content item has been determined to have a likelihood of including third party content.

Figure 4:
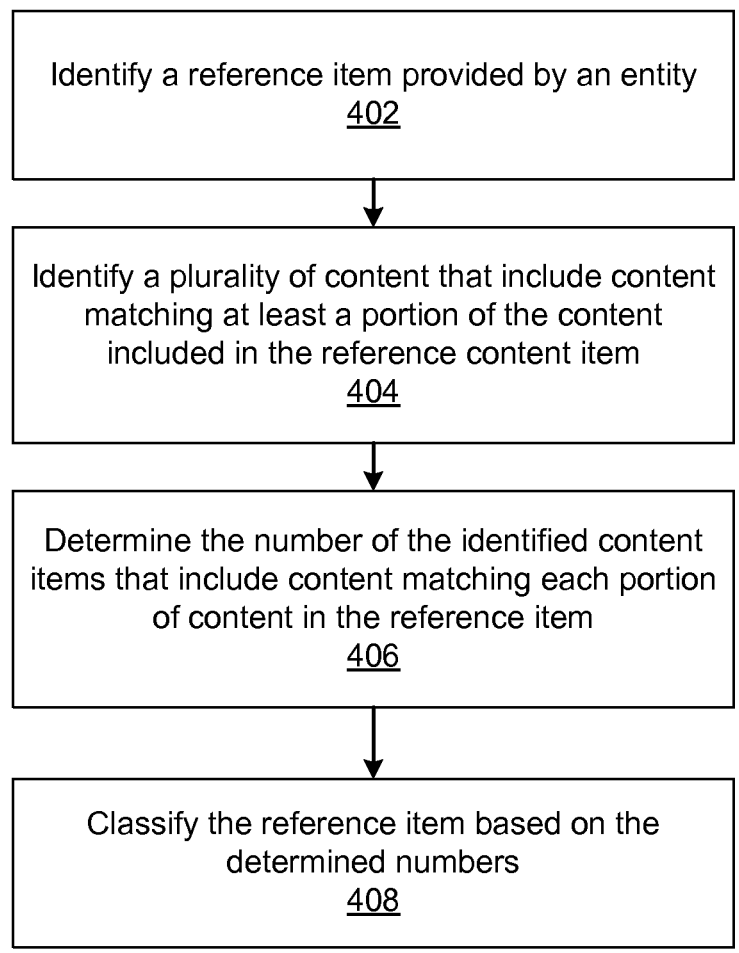
FIG. 4 is a flowchart of an example process for identifying reference content items that have a high likelihood of including third party content according to an embodiment.

FIG. 4 is a flowchart of an example process for identifying reference content items that have a high likelihood of including third party content according to an embodiment. The process begins with the content matching module 102 identifying 402 a reference content item provided by an entity and stored in the reference repository 106.

The content matching module 102 then identifies 404 content items stored in the content repository 102 that include at least a portion of the content included in a reference content item. In one embodiment, the claim identification module 109 is configured with a matching algorithm that identifies, for a given content item, which, if any, portions of the content item match at least one portion of the reference content item. In other embodiments, alternative mechanisms for matching portions of content are within the scope here.

The classification module 204 determines the number of the identified content items that include content matching each portion of content in the reference content item. The classification module 204 then classifies the reference content item based on the determined numbers. The classification of a reference content item indicates the likelihood that the reference content item includes third party content to which the entity that provided the reference content item does not have rights.

Figure 5:
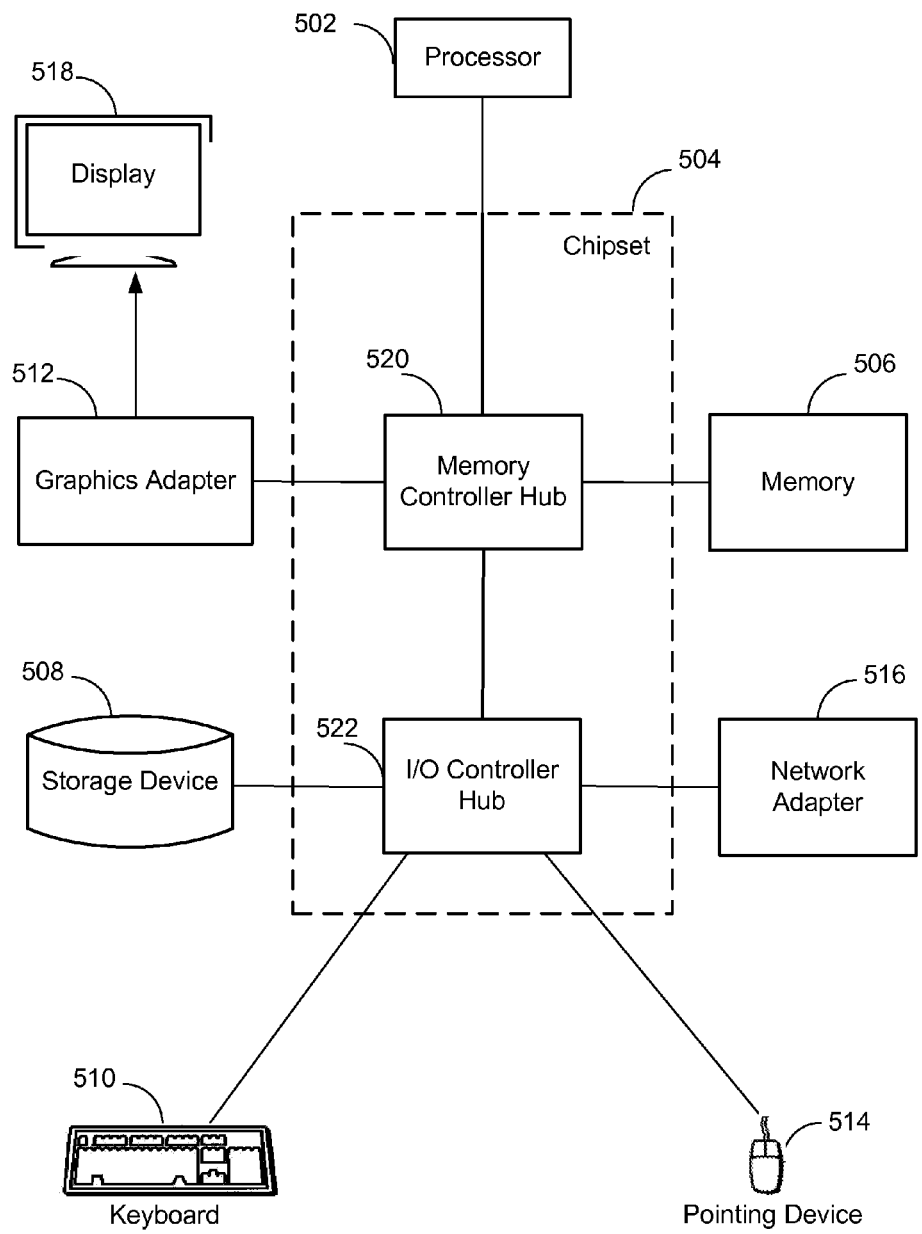
FIG. 5 is a high-level block diagram illustrating an example computer usable to implement each of the entities in FIG. 1 according to one embodiment.

FIG. 5 is a block diagram illustrating an example computer 500 usable to implement each of the entities in FIG. 1 according to one embodiment. The computer 500 includes at least one processor 502 (e.g., a central processing unit, a graphics processing unit) coupled to a chipset 504. The chipset 504 includes a memory controller hub 520 and an input/output (I/O) controller hub 522. A memory 506 and a graphics adapter 512 are coupled to the memory controller hub 520, and a display 518 is coupled to the graphics adapter 512. A storage device 508, keyboard 510, pointing device 514, and network adapter 516 are coupled to the I/O controller hub 522. Other embodiments of the computer 500 have different architectures.

The storage device 508 is a non-transitory computer-readable storage medium such as a hard drive, compact disk read-only memory (CD-ROM), DVD, or a solid-state memory device. The memory 506 holds instructions and data used by the processor 502. The processor 502 may include one or more processors 502 having one or more cores that execute instructions. The pointing device 514 is a mouse, track ball, or other type of pointing device, and is used in combination with the keyboard 510 to input data into the computer 500. The graphics adapter 512 displays digital content and other images and information on the display 518. The network adapter 516 couples the computer 500 to one or more computer networks (e.g., network 150).

The computer 500 is adapted to execute computer program modules for providing functionality described herein including presenting digital content, playlist lookup, and/or metadata generation. As used herein, the term "module" refers to computer program logic used to provide the specified functionality. Thus, a module can be implemented in hardware, firmware, and/or software. In one embodiment of a computer 500 that implements the content hosting service 100, program modules such as the content interface 108 and reference verification module 110 are stored on the storage device 508, loaded into the memory 506, and executed by the processor 502.

The types of computers 500 used by the entities of the content sharing environment can vary depending upon the embodiment and the processing power required by the entity. For example, the content hosting service 100 might comprise multiple blade servers working together to provide the functionality described herein. The computers 500 may contain duplicates of some components or may lack some of the components described above (e.g., a keyboard 510, a graphics adapter 512, a pointing device 514, a display 518). For example, the content hosting service 100 may run in a single computer 500 or multiple computers 500 communicating with each other through a network such as in a server farm.

Although the foregoing description has focused primarily on videos for purposes of providing a concrete illustration, various embodiments may incorporate different types of digital content in different forms of playlists. In one embodiment, the content repository 102 contains audio files in playlists, which may be presented through an audio player instead of a video player. It should be noted that videos may contain audio files as well. As another embodiment, the content repository 102 contains images and/or animations organized in albums instead of playlists. Rather than using a video or an audio player, these images and/or animations may be presented in a slideshow, which may contain auto-play functionality (e.g., the slideshow retrieves a next image or animation after a period of time). In yet another embodiment, the digital content includes text, which may be organized into textual collections (e.g., chapters in a book, installments in a short story series, poems in an anthology). Digital content may include combinations of video, audio, images, animations, and/or text.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. To implement these operations, the content hosting service 100 may use a non-transitory computer-readable medium that stores the operations as instructions executable by one or more processors. Any of the operations, processes, or steps described herein may be performed using one or more processors. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the embodiments. This description should be read to include one or at least one and the singular also includes the plural unless it is obvious that it is meant otherwise.

Additional alternative structural and functional designs may be implemented for a system and a process for the environment of FIG. 1. Thus, while particular embodiments and applications have been illustrated and described, it is to be understood that the disclosed embodiments are not limited to the precise construction and components disclosed herein. Various modifications, changes and variations may be made in the arrangement, operation and details of the method and apparatus disclosed herein without departing from the spirit and scope defined in the appended claims.

I claim:

1. A computer implemented method for identifying reference video content that includes third party content, the method comprising:
    identifying a candidate reference video content provided by an entity to a content hosting service, the candidate reference video content for evaluation by the content hosting service to determine whether the candidate reference video content includes third party content that is not owned by the entity, wherein the candidate reference video content is compared against a plurality of uploaded video content items that have been uploaded to the content hosting service;
    segmenting the candidate reference video content into a plurality of portions of the candidate reference video content;
    identifying a subset of the plurality of uploaded video content items that include at least one of the plurality of portions of the candidate reference video content;
    for each of the plurality of portions of the candidate reference video content, determining whether the candidate reference video content is likely to include third party content that is not owned by the entity by determining a portion match frequency of how often that portion of the candidate reference video content item is included in one of the plurality of uploaded video content items, wherein the portion match frequency is based on a total number of the identified subset of the plurality of uploaded video content items that matches at least one of the plurality of portions of the candidate reference video content in comparison with a number of the identified subset of the plurality of uploaded video content items that match that portion of the candidate reference content;

classifying the candidate reference video content based on the determined portion match frequency, wherein the candidate reference video content is classified as likely to include third party content that is not owned by the entity when the portion match frequency for a portion of the candidate reference video content is greater than a particular threshold value; and modifying the application of the candidate reference video content based on the classification when being compared with a video content item that has been uploaded to the content hosting service.

2. The method of claim 1, wherein identifying the subset of the plurality of content items comprises, for each content item, matching each portion of content included in one of the plurality of uploaded content items with each of the plurality of portions of the candidate reference video content.

3. The method of claim 1, wherein the portion match frequency for a given portion indicating a percentage of a total number of the plurality of content items that include the given portion.

4. The method of claim 3, wherein determining the portion match frequency comprises:

determining an average difference between the portion match frequency for the given portion of the candidate reference video content and portion match frequencies for the remaining portions of the candidate reference video content.

5. The method of claim 4, wherein classifying the candidate reference video content comprises:

classifying the candidate reference video content as having a higher than a threshold likelihood of including third party content when the average difference for the given portion is above a threshold difference.

6. The method of claim 4, wherein classifying the candidate reference video content comprises:

classifying the candidate reference video content as having a lower than a threshold likelihood of including third party content when the average difference for the given portion is below a threshold difference.

7. The method of claim 1, wherein classifying comprises classifying the candidate reference video content based on a category of the candidate reference video content.

8. The method of claim 7, wherein the category of the candidate reference video content is a whitelisted category, and classifying further comprises classifying the candidate reference video content as having a lower than threshold likelihood of including third party content.

9. The method of claim 7, wherein the category of the candidate reference video content is a whitelisted category, and classifying further comprises adjusting the likelihood is adjusted by a weighting factor.

10. A non-transitory computer readable storage medium storing instructions that, when executed by a processor, cause the processor to identify reference video content that includes third party content by performing the steps of:

identifying a candidate reference video content provided by an entity to a content hosting service, the candidate reference video content for evaluation by the content hosting service to determine whether the candidate reference video content includes third party content that is not owned by the entity, wherein the candidate reference video content is compared against a plurality of uploaded video content items that have been uploaded to the content hosting service;

segmenting the candidate reference video content into a plurality of portions of the candidate reference video content;

identifying a subset of the plurality of uploaded video content items that include at least one of the plurality of portions of the candidate reference video content;

for each of the plurality of portions of the candidate reference video content, determining whether the candidate reference video content is likely to include third party content that is not owned by the entity by determining a portion match frequency of how often that portion of the candidate reference video content item is included in one of the plurality of uploaded video content items, wherein the portion match frequency is based on a total number of the identified subset of the plurality of uploaded video content items that matches at least one of the plurality of portions of the candidate reference video content in comparison with a number of the identified subset of the plurality of uploaded video content items that match that portion of the candidate reference content;

classifying the candidate reference video content based on the determined portion match frequency, wherein the candidate reference video content is classified as likely to include third party content that is not owned by the entity when the portion match frequency for a portion of the candidate reference video content is greater than a particular threshold value; and modifying the application of the candidate reference video content based on the classification when being compared with a video content item that has been uploaded to the content hosting service.

11. The non-transitory computer readable storage medium of claim 10, wherein identifying the subset of the plurality of content items comprises, for each content item, matching each portion of content included in one of the plurality of uploaded content item with each of the plurality of portions of the candidate reference video content.

12. The non-transitory computer readable storage medium of claim 10, wherein the portion match frequency for a given portion indicating a percentage of a total number of the plurality of content items that include the given portion.

13. The non-transitory computer readable storage medium of claim 12, wherein determining the portion match frequency comprises:

determining an average difference between the portion match frequency for the given portion of the candidate reference video content and portion match frequencies for the remaining portions of the candidate reference video content.

14. The non-transitory computer readable storage medium of claim 13, wherein classifying the candidate reference video content comprises:

classifying the candidate reference video content as having a higher than a threshold likelihood of including third party content when the average difference for the given portion is above a threshold difference.

15. The non-transitory computer readable storage medium of claim 13, wherein classifying the candidate reference video content comprises:

classifying the candidate reference video content as having a lower than a threshold likelihood of including third party content when the average difference for the given portion is below a threshold difference.

16. The non-transitory computer readable storage medium of claim 10, wherein classifying comprises classifying the candidate reference video content based on a category of the reference video content.

17. The non-transitory computer readable storage medium of claim 16, wherein the category of the candidate reference video content is a whitelisted category, and classifying further comprises classifying the candidate reference video content as having a lower than threshold likelihood of including third party content.

18. The non-transitory computer readable storage medium of claim 16, wherein the category of the candidate reference video content is a whitelisted category, and classifying further comprises adjusting the likelihood is adjusted by a weighting factor.

19. A computer system, comprising
a memory for storing instructions; and
a processor configured to execute the instructions to perform the steps of:
identifying a candidate reference video content provided by an entity to a content hosting service, the candidate reference video content for evaluation by the content hosting service to determine whether the candidate reference video content includes third party content that is not owned by the entity, wherein the candidate reference video content is compared against a plurality of uploaded video content items that have been uploaded to the content hosting service;
segmenting the candidate reference video content into a plurality of portions of the candidate reference video content;
identifying a subset of the plurality of uploaded video content items that include at least one of the plurality of portions of the candidate reference video content;
for each of the plurality of portions of the candidate reference video content, determining whether the candidate reference video content is likely to include third party content that is not owned by the entity by determining a portion match frequency of how often that portion of the candidate reference video content item is included in one of the plurality of uploaded video content items, wherein the portion match frequency is based on a total number of the identified subset of the plurality of uploaded video content items that matches at least one of the plurality of portions of the candidate reference video content in comparison with a number of the identified subset of the plurality of uploaded video content items that match that portion of the candidate reference content;
classifying the candidate reference video content based on the determined portion match frequency, wherein the candidate reference video content is classified as likely to include third party content that is not owned by the entity when the portion match frequency for a portion of the candidate reference video content is greater than a particular threshold value; and
modifying the application of the candidate reference video content based on the classification when being compared with a video content item that has been uploaded to the content hosting service.

20. The system of claim 19, wherein the portion match frequency for a given portion indicating a percentage of a total number of the plurality of content items that include the given portion.

21. The method of claim 1, wherein the entity owns at least a portion of content included in the candidate reference video.

* * * * *